(12) United States Patent
Harshbarger et al.

(10) Patent No.: US 10,794,150 B2
(45) Date of Patent: Oct. 6, 2020

(54) PREDICTING AND OPTIMIZING DRILLING EQUIPMENT OPERATING LIFE USING CONDITION BASED MAINTENANCE

(71) Applicant: FORUM US, INC., Houston, TX (US)

(72) Inventors: Chris Harshbarger, Cypress, TX (US); Juan Arbelaez, Houston, TX (US); Shane Richard, Tomball, TX (US); Gerardo Guerra, Houston, TX (US); Pinkeshkumar Attarwala, Houston, TX (US)

(73) Assignee: FORUM US, INC., Houston, TX (US)

( * ) Notice: Subject to any disclaimer, the term of this patent is extended or adjusted under 35 U.S.C. 154(b) by 253 days.

(21) Appl. No.: 15/625,048

(22) Filed: Jun. 16, 2017

(65) Prior Publication Data

US 2018/0363421 A1 Dec. 20, 2018

(51) Int. Cl.
*E21B 41/00* (2006.01)
*E21B 19/14* (2006.01)
*G05B 23/02* (2006.01)

(52) U.S. Cl.
CPC .............. *E21B 41/00* (2013.01); *E21B 19/14* (2013.01); *G05B 23/0283* (2013.01)

(58) Field of Classification Search
CPC ...... E21B 41/00; E21B 19/14; G05B 23/0283
See application file for complete search history.

(56) References Cited

U.S. PATENT DOCUMENTS

| | | | |
|---|---|---|---|
| 4,470,740 A * | 9/1984 | Frias | E21B 19/15 414/22.61 |
| 5,794,720 A | 8/1998 | Smith et al. | |
| 6,600,418 B2 | 7/2003 | Francis et al. | |
| 6,659,174 B2 | 12/2003 | Hogan | |
| 7,036,729 B2 | 5/2006 | Chung | |
| 7,457,785 B1 * | 11/2008 | Greitzer | G01D 1/18 706/12 |
| 7,603,296 B2 | 10/2009 | Whiteley et al. | |
| 7,962,319 B2 | 6/2011 | Grayson | |
| 8,204,697 B2 | 6/2012 | Garvey et al. | |
| 8,215,417 B2 | 7/2012 | Annaiyappa et al. | |
| 8,793,081 B1 | 7/2014 | Loverich et al. | |
| 8,825,414 B2 | 9/2014 | Garvey et al. | |
| 9,030,324 B2 | 5/2015 | Christiansen et al. | |
| 9,260,943 B2 | 2/2016 | Eriksson et al. | |
| 9,269,199 B2 | 2/2016 | Laughlin et al. | |
| 9,417,160 B2 | 8/2016 | Hunter | |
| 9,418,266 B1 | 8/2016 | Malone | |

(Continued)

OTHER PUBLICATIONS

International Search Report and Written Opinion dated Sep. 17, 2018, corresponding to Application No. PCT/US2018/032224.

*Primary Examiner* — Leslie J Evanisko
*Assistant Examiner* — Leo T Hinze
(74) *Attorney, Agent, or Firm* — Patterson & Sheridan, L.L.P.

(57) ABSTRACT

A system configured to predict and optimize operating life of a piece of drilling equipment includes a plurality of operating sensors coupled to a piece of drilling equipment, wherein each of the operating sensors is configured to measure an operating condition of the piece of drilling equipment. A control system in communication with the operating sensors is configured to calculate an operating life of the piece of equipment based on the operating conditions.

21 Claims, 3 Drawing Sheets

(56) References Cited

U.S. PATENT DOCUMENTS

| | | |
|---|---|---|
| 9,453,854 B2 | 9/2016 | Kraige et al. |
| 9,547,831 B2 | 1/2017 | Laase et al. |
| 9,657,567 B2 | 5/2017 | Malayappalayam Shanmugam et al. |
| 2001/0047283 A1 | 11/2001 | Melick et al. |
| 2008/0024274 A1 | 1/2008 | Ishida et al. |
| 2008/0059411 A1 | 3/2008 | Greiner et al. |
| 2008/0201388 A1 | 8/2008 | Wood et al. |
| 2009/0121895 A1 | 5/2009 | Denny et al. |
| 2013/0298664 A1 | 11/2013 | Gillette, II |
| 2015/0332073 A1 | 11/2015 | Murphy |
| 2016/0237804 A1* | 8/2016 | Papadimitriou .... E21B 47/0006 |
| 2016/0305865 A1 | 10/2016 | Silva et al. |
| 2016/0306831 A1 | 10/2016 | Holmes et al. |
| 2016/0370259 A1 | 12/2016 | Loverich et al. |
| 2018/0095455 A1 | 4/2018 | Silva et al. |

* cited by examiner

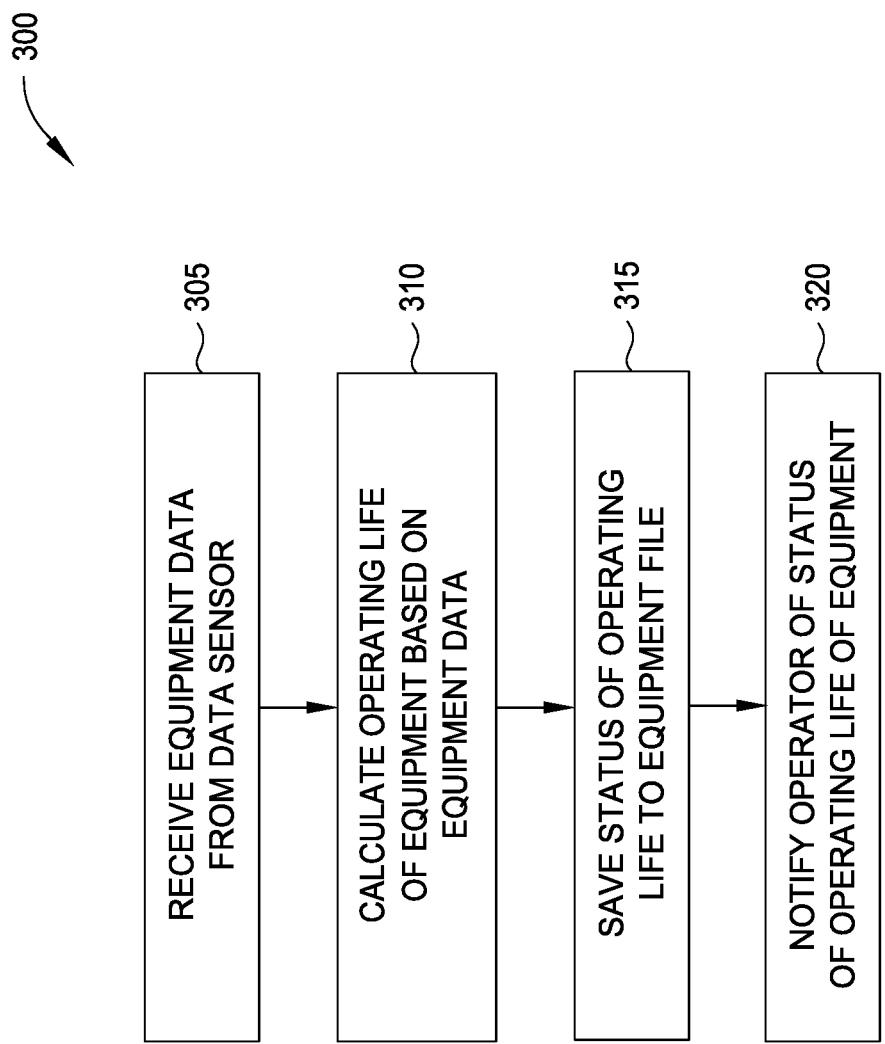

PREDICTING AND OPTIMIZING DRILLING EQUIPMENT OPERATING LIFE USING CONDITION BASED MAINTENANCE

BACKGROUND

Field

Embodiments of this disclosure relate to methods and systems for predicting and optimizing the operating life of drilling equipment by performing maintenance on the equipment based on its operating condition.

Description of the Related Art

Drilling equipment, such as catwalks, elevators, mud pumps, etc. are often operated beyond their operating specifications. The equipment is designed for a specific use, so when it is consistently operated above the operational parameters, the equipment can fail prematurely. On the other hand, when the equipment is operated significantly below the operational parameters, it can last longer between maintenance cycles and have a longer operating life.

Current methods of performing maintenance on the equipment is purely schedule driven and does not take into account how the equipment is operated. For example, a maintenance manual dictates how long the equipment should be kept in service before the next maintenance cycle without regard to how the equipment is being operated or the conditions in which the equipment is operated. Maintenance on the equipment therefore often conducted too late or too early and not on the actual operating condition of the equipment.

Therefore there is a need for new and improved methods and systems for predicting and optimizing the operating life of drilling equipment using condition based maintenance.

SUMMARY

In one embodiment, a system configured to predict and optimize operating life of drilling equipment comprises a piece of drilling equipment; a plurality of operating sensors coupled to the piece of drilling equipment, wherein each of the operating sensors are configured to measure an operating condition of the piece of drilling equipment; and a control system in communication with the operating sensors and configured to calculate an operating life of the piece of equipment based on the operating conditions.

In one embodiment, a method for predicting and optimizing operating life of drilling equipment comprises receiving data from a plurality of components of a piece of drilling equipment corresponding to operating conditions of the piece of drilling equipment; calculating an operating life of the piece of equipment based on the operating conditions; saving the data corresponding to the operating conditions and the operating life to an equipment file; and notifying an operator of a status of the operating life.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a flowchart depicting a method of optimizing the operating life of drilling equipment using condition based maintenance.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiment disclosed herein relate to drilling equipment having a data sensor configured to monitor the operational parameters and/or operating condition of the equipment to predict and optimize its operating life. A piece of equipment includes the entire/whole piece equipment, a portion of the equipment, or an individual component of the equipment. The data sensor may be in communication with one or more operating sensors coupled to the equipment. The data sensor is configured to gather data relating to the operating condition of the equipment from the operating sensors, and communicate the data to a control system.

The control system is configured to predict the remaining operating life of the equipment, as well as optimal service intervals for the equipment to optimize the operating life of the equipment based on the data. The data gathered by the data sensor from the operating sensors may include identification of the equipment, service records of the equipment, information on cycles of the equipment (e.g., number of cycles and/or weight per cycle), temperature the equipment, pressure of the equipment, load on the equipment, as well as other operating condition related data. The control system may contain an operating life software algorithm configured to calculate the operating life and timing of the next maintenance cycle of the equipment based on how the equipment is being operated and/or the condition that it is in.

Figure 1:
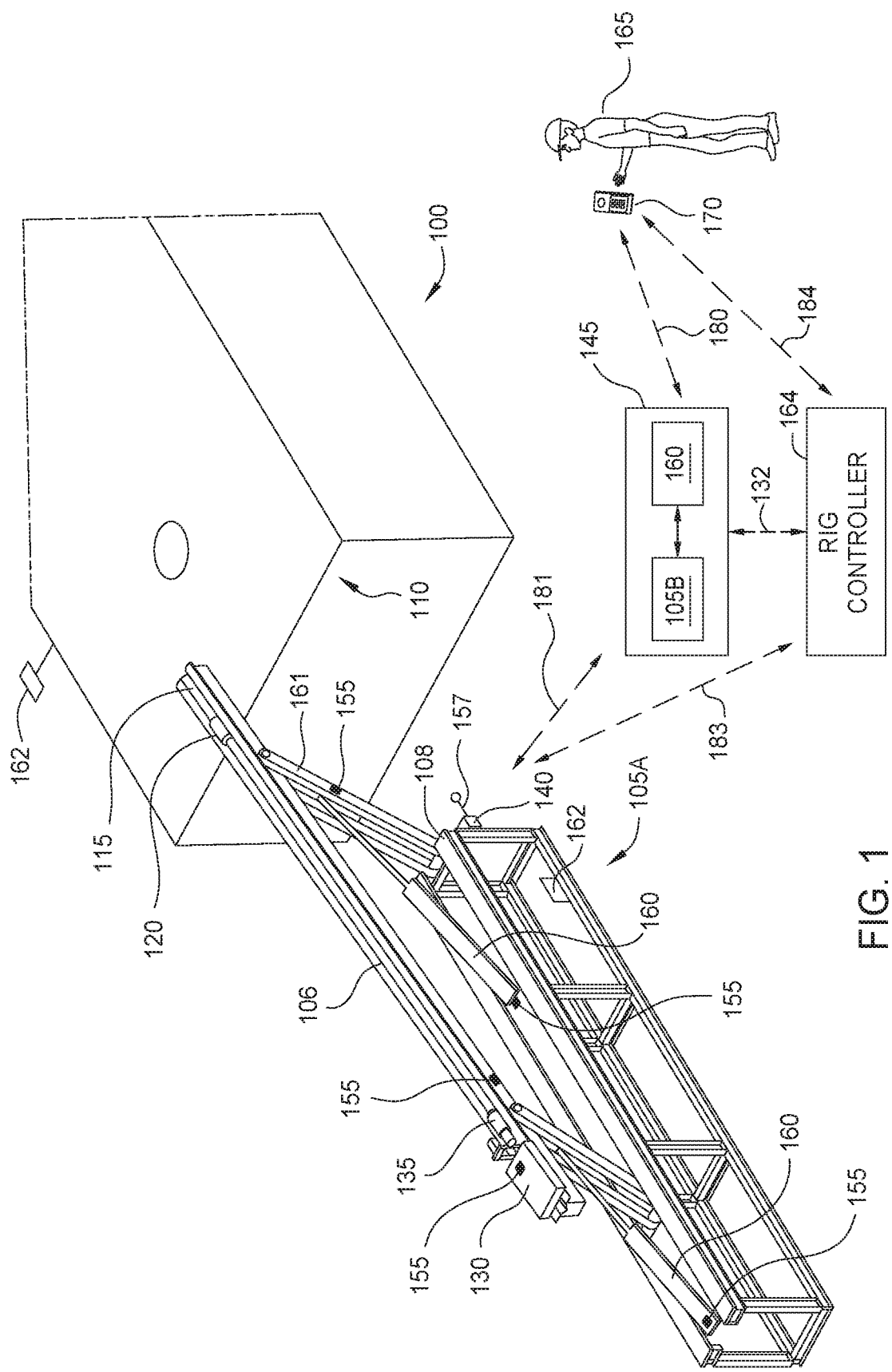
FIG. 1 is a schematic of a catwalk next to a rig according to one embodiment.

FIG. 1 is a schematic view of a catwalk 105A next to a rig 100 according to one embodiment. The catwalk 105A depicted in FIG. 1 is only one example of the various types of drilling equipment that the embodiments disclosed herein can be used with to calculate operating life. Other examples of drilling equipment include but are not limited to elevators, mud pumps, tubular handling tools, etc.

The catwalk 105A is configured to convey a tubular 106 between a staging rack 108 and a rig floor 110. The catwalk 105A includes a trough 115 that is raised and lowered by one or more piston/cylinders 160 via one or more cross bars 161, and along which the tubular 106 is conveyed to and from the drill floor 110. The tubular 106 has a box end 120 that may be engaged by a lifting device, such as an elevator on the rig 100, to transfer the tubular 106 to and from the catwalk 105A and the drill floor 110. A skate 130 may engage a pin end 135 of the tubular 106 and push or pull the tubular 106 along the length of the trough 115 during transfer of the tubular 106.

A data sensor 140 is coupled to the catwalk 105A. The data sensor 140 is in communication one or more operating sensors 155 that are coupled to various components of the catwalk 105A. The data sensor 140 is configured to gather operating condition related data of the various components of the catwalk 105A from the operating sensors 155, and transmit the data to a control system 145. The data sensor 140 may include a memory, a battery, and a transmitter, collectively shown as a transmission device 157 to save and transmit the data to the control system 145.

In one embodiment, the data sensor 140 and/or the operating sensors 155 may include a radio frequency identification (RFID) tag. In one embodiment, the data sensor 140 and/or the operating sensors 155 may comprise a global positioning system (GPS) enabled RFID tag so that location information, as well as operational conditions of the catwalk 105A and/or components thereof, may be monitored and determined. The location data and the operational data may be transmitted to the control system 145 to help predict operating life and optimal maintenance periods of the catwalk 105A.

In one embodiment, the catwalk 105A and/or the rig 100 may include an environmental monitor 162. The environmental monitor 162 may be utilized to gather data related to the environment in which the catwalk 105A and/or the rig 100 are located. The environmental monitor 162 may gather temperatures, humidity, wind speeds, particulate (dust) measurements, or other environmental conditions where the catwalk 105A and/or the rig 100 are located. The environmental data may be transmitted to the data sensor 140 and/or the control system 145 to help predict operating life and optimal maintenance periods of the catwalk 105A.

The operating sensors 155 may be strain gauges, proximity sensors, load sensors, temperature sensors, pressure sensors, fluid particle sensors, and/or any other type of sensor that can measure an operating condition of the catwalk 105A or a component of the catwalk 105A. The operating sensors 155 may be used to determine and/or measure stress, strain, load, torque, fluid quality, temperature, pressure, flow rate, strokes, cycles, time, and/or any other operating condition of the catwalk 105A or a component of the catwalk 105A. The data from the operating sensors 155 is communicated to the data sensor 140 and the control system 145 to continuously monitor the operation of the catwalk 105A and/or a component of the catwalk 105A and predict operating life and optimal maintenance periods.

In one example, the operating sensors 155 may be used to determine the number of times the trough 115 is raised and lowered by measuring the number of strokes of the piston/cylinders 160 and/or the number of cycles that the piston/cylinders 160 have been pressurized. In another example, the operating sensors 155 may be used to determine the weight of the tubular 106 by measuring the load on the trough 115 and/or the cross bars 161. In another example, the operating sensors 155 may be used to determine the number of cycles that the skate 130 has been actuated by measuring the proximity of the skate 130 to each end of the trough 115.

The operating conditions of the catwalk 105A measured by the operating sensors 155 may be communicated to the data sensor 140 via a wired or wireless connection. The operating conditions of the catwalk 105A measured by the operating sensors 155 may be communicated directly to the control system 145 via a wired or wireless connection. The operating conditions measured by the operating sensors 155 and communicated to the data sensor 140 may be communicated to the control system 145 via a wired or wireless connection 181.

The operating conditions communicated to the control system 145 may be saved to a catwalk file 105B and analyzed by an operating life algorithm 160 configured to calculate the remaining operating life of the catwalk 105A or a component of the catwalk 105A, as well as determine optimal maintenance periods. The operating life algorithm 160 can continuously update the calculated results to the catwalk file 105A as it receives data from the data sensor 140 and/or the operating sensors 155. The operating life algorithm 160 can calculate fatigue, number of strokes, number of cycles, and/or any other operating condition that can be used to inform an operator of the status of the catwalk 105A or a component of the catwalk 105A.

The operating condition of the catwalk 105A can be continuously monitored real-time and thereby increase safety, predict end of operating life, and optimize maintenance times, among other actions. The data acquired by monitoring the real-time operating condition of the catwalk 105A provides an operator with valuable insight into the performance of the equipment, for example, if the catwalk 105A is being operated above or below design specifications, such as weight limits or number of cycle. If the catwalk 105A is being operated above (or below) design specifications, then the operator can schedule inspection and/or maintenance sooner (or later) than a scheduled maintenance period. If the catwalk 105A is being operated above (or below) design specifications, then the operator can change the operation by lessening (or increasing) the loads, reducing (or increasing) cycle time, and/or adjusting any other operating condition to stay within design specifications.

In one embodiment, the control system 145 may be configured to actively intervene with the operation of the catwalk 105A and/or the rig 100. For example, if a potentially dangerous condition is detected based on the data from the data sensor 140 and/or the operating sensors 155, then the control system 145 may intervene, such as by changing the operating parameters of the catwalk 105A or components thereof. Potential dangerous conditions may include a structural weakness, low or no fluid flow, exceeding operating temperatures, among other conditions that may damage a component and/or pose a safety risk to personnel. Operating parameters of the catwalk 105A and/or components thereof that may be controlled by the control system 145 include adjusting, such as increasing or decreasing, operating speeds up to and including a complete stop of one or more components.

In one embodiment, the control system 145 may be in communication with a rig controller 164 via a wired or wireless connection 132. The rig controller 164 is configured to control the operation of the catwalk 105A and/or the rig 100 such as by communication with the operating sensors 155, the data sensor 140, and/or the control system 145 via a wired or wireless connection 183. The rig controller 164 may be an on-site controller that is monitored by personnel, such as an operator 165, and includes switches, dials, and other devices that provide power, fluids, and/or operating instructions to the catwalk 105A and/or the rig 100. The rig controller 164 can also be monitored and/or controlled by the operator 165 through a mobile device 170 via a wired or wireless connection 184.

The rig controller 164 may be manually operated and/or controlled via a central processing unit. In the case of manual control, the control system 145 may send a signal to a mechanical device that is configured to trip a switch, move a dial, and/or perform a movement mimicking a human interaction that alters the power, fluids, and/or operating instructions to the catwalk 105A and/or the rig 100. In the case of a central processing unit, the control system 145 may send an instruction to the rig controller 164 that alters the power, fluids, and/or operating instructions to the catwalk 105A and/or the rig 100. In one embodiment, the rig controller 164 and the control system 145 may be integrated into a single control system.

The operating life algorithm 160 may be configured to determine remaining operating life and condition based maintenance of drilling equipment. For example, instead of performing maintenance dictated solely by a calendar, an operator may delay time-based scheduled maintenance if the equipment is being operated under specifications. Alternatively, if the equipment is being operated within or beyond the equipment specifications, then maintenance cycles may be determined to occur sooner based on real-time loads, cycles, temperatures, pressures, and/or flows associated with the equipment.

The operator 165 may communicate with the control system 145 via a mobile device 170 to gain access to the catwalk file 105B via a wired or wireless connection 180. The mobile device 170 may be a laptop, a mobile phone, an electronic tablet, and/or any other type of device that can communicate with the control system 145 via wired or wireless communication. The catwalk file 105B includes the data corresponding to the operating condition of the catwalk 105A, and may further include operation manuals, service records, test reports, identification papers, drawings, maintenance history, certifications, and notes indicating field issues, field repairs, etc. The operator 165 having the mobile device 170 can get immediate access to real-time data regarding the operating condition of the catwalk 105A or a component of the catwalk 105A.

The operator 165 can view and/or download the data in the catwalk file 105B on the mobile device 170. In addition, the operator 165 can add and/or update data to the catwalk file 105B using the mobile device 170. For example, the operator 165 can add notes regarding any operating issues with the catwalk 105A to the catwalk file 105B. For another example, if maintenance is performed on the catwalk 105A, then the maintenance records can be uploaded to the catwalk file 105B by the operator 165 for subsequent reference by other operators.

Figure 2:
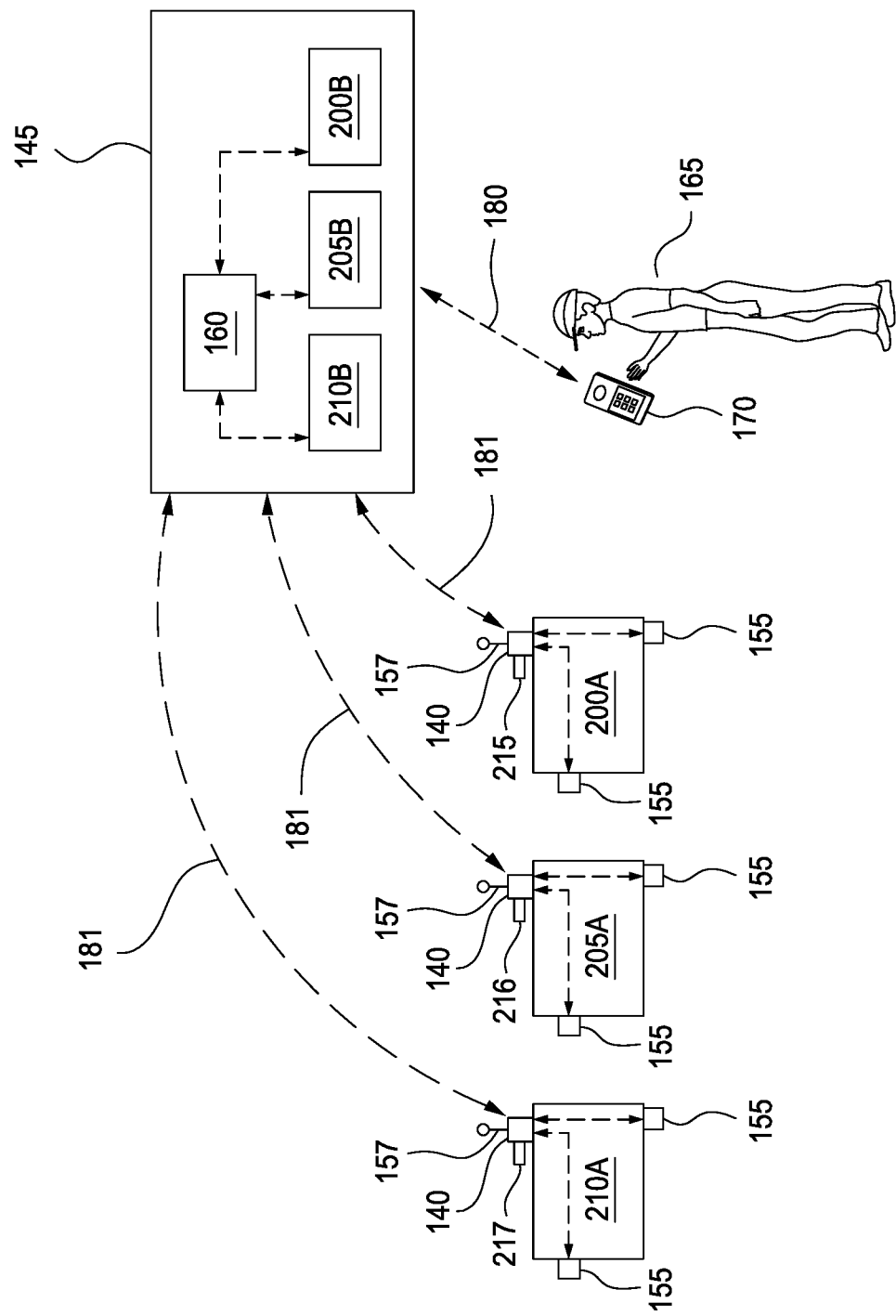
FIG. 2 is a schematic of an access procedure utilized to obtain information from drilling equipment.

FIG. 2 is a schematic of an access procedure utilized to obtain information about one or more pieces of drilling equipment 200A, 205A, 210A. The drilling equipment 200A, 205A, 210A may be the catwalk 105A or a component of the catwalk 105A of FIG. 1, and/or may be another piece of equipment such as an elevator, a mud pump, or other equipment used with the rig 100 of FIG. 1. Each piece of drilling equipment 200A, 205A, 210A has a data sensor 140 and operating sensors 155 as described above. The mobile device 170 is configured to access drilling equipment files 200B, 205B, 210B that contain information about the operating condition of the corresponding drilling equipment 200A, 235A, 240A, respectively, based on a unique identifier 215, 216, 217 of that piece of equipment's data sensor 140 via the wired or wireless connection 180.

Real-time operating conditions of any of the pieces of drilling equipment 200A, 205A, 210A communicated to the control system 145 by the data sensors 140 and/or the operating sensors 155 may be uploaded to the drilling equipment file 200B, 205B, 210B via the wired or wireless connection 181. The data corresponding to the real-time operating conditions may be analyzed by the operating life algorithm 160 to calculate remaining operating life and optimal maintenance periods, as well as inform the operator 165 of any potential problems that might exist. The data may be communicated to the control system 145 continuously or at pre-determined time intervals.

FIG. 3 is a flowchart depicting a method 300 of predicting and optimizing drilling equipment operating life according to one embodiment. At 305, the control system 145 receives data corresponding to the operating condition of a piece of equipment from one or more operating sensors 155 via the data sensor 140. The operating sensors 155 may measure stress, strain, load, torque, fluid quality, temperature, pressure, flow rate, strokes, cycles, time, and/or any other operating condition of the equipment. The data may be communicated to the control system 145 via the wired or wireless connection 181.

At 310, the control system 145 calculates the operating life of the piece of equipment based on the data retrieved from the data sensor 140. The calculation may be performed by the operating life algorithm 160. The calculation may be based on a comparison of the data received from the data sensor 140 with preprogrammed data and/or historical data regarding the equipment. The preprogrammed data and/or historical data may include design specifications of the equipment, scheduled maintenance periods, and/or prior maintenance records. The calculation may include an optimized maintenance schedule based on the calculated operating life and/or operating condition of the equipment. The calculation may also include fatigue, number of strokes, number of cycles, and/or any other operating condition that can be used to inform an operator of the status of the equipment.

At 315, the control system 145 saves the data including the calculated results to an equipment file. At 320, the control system 145 notifies the operator of the status of the operating life of the piece of equipment. The data sensor 140 and/or the operating sensors 155 may be configured to continuously communicate data corresponding to the operating condition of the equipment, and the control system 145 may be configured to continuously calculate the remaining operating life of the equipment and/or an optimal maintenance schedule based on the real-time operating condition of the equipment.

While the foregoing is directed to embodiments of the disclosure, other and further embodiments may be devised without departing from the basic scope thereof, and the scope thereof is determined by the claims that follow.

The invention claimed is:

1. A system configured to predict and optimize operating life of drilling equipment, comprising:
   a catwalk, the catwalk comprising:
      a staging rack having a first end and a second end;
      a first cross bar having an upper end and a lower end pivotably coupled to the first end of the staging rack;
      a first piston assembly having an extendable piston coupled to the first cross bar and disposed within a cylinder coupled proximate to the first end of the staging rack;
      a second cross bar having an upper end and a lower end pivotably coupled to the second end of the staging rack;
      a second piston assembly having an extendable piston coupled to the second cross bar and disposed within a cylinder coupled proximate to the second end of the staging rack; and
      a pipe handling trough pivotably coupled to the upper end of the first cross bar and the upper end of the second cross bar;
   a plurality of operating sensors coupled to at least one of the first or second piston assemblies, wherein each of the operating sensors are configured to measure a load exerted on at least one of the first or second piston assemblies to which the operating sensors are coupled;

a data sensor coupled to the catwalk and configured to receive a set of data from the operating sensors, the data sensor comprising a transmission device configured to send the set of data over a wired or wireless connection, the set of data pertaining to the load exerted on at least one of the first or second piston assemblies;

a control system in communication with at least one of the operating sensors or the data sensor, and configured to:
determine a weight of a tubular based on the load exerted on at least one of the first or second piston assemblies,
determine if the weight is above or below a weight limit,
calculate an operating life of the catwalk based on the load exerted on at least one of the first or second piston assemblies, and
calculate a maintenance schedule based on the load exerted on at least one of the first or second piston assemblies, or the operating life of the catwalk, the maintenance schedule comprising one or more optimal service intervals;

a rig controller in communication with at least one of the operating sensors, the data sensor, or the control system, and configured to receive a signal from at least one of the operating sensors, the data sensor, or the control system, and in response alter at least one of power, fluids, or operating parameters supplied to the catwalk; and a mobile device in communication with at least one of the rig controller or the control system, and configured to send instructions to at least one of the rig controller or the control system to alter at least one of power, fluids, or operating parameters supplied to the catwalk.

2. The system of claim 1, wherein the control system is configured to calculate at least one of fatigue, number of strokes, or number of cycles of the catwalk based on the set of data sent by at least one of the operating sensors or the data sensor.

3. The system of claim 1, wherein the control system includes an operating life algorithm configured to compare the load exerted on at least one of the first or second piston assemblies to pre-programmed data corresponding to the catwalk.

4. The system of claim 1, wherein the operating sensors include at least one of strain gauges, proximity sensors, load sensors, temperature sensors, pressure sensors, and fluid particle sensors.

5. The system of claim 1, wherein the data sensor includes a radio frequency identification tag.

6. The system of claim 1, wherein the control system is configured to save the set of data sent by at least one of the operating sensors or the data sensor and the operating life to a catwalk file.

7. The system of claim 6, wherein the mobile device is configured to transmit input data to the control system and access the catwalk file.

8. The system of claim 1, wherein the control system includes an operating life algorithm configured to compare the weight of the tubular to pre-programmed data corresponding to the catwalk to determine if the weight is above or below the weight limit.

9. A method for predicting and optimizing operating life of drilling equipment, comprising:
operating a catwalk to convey a tubular between a staging rack and a rig floor;
measuring a load exerted on the catwalk with an operating sensor;
receiving data corresponding to the load from the operating sensor or a data sensor in communication with the operating sensor;
determining a weight of the tubular based on the data corresponding to the load via a control system that receives the data from the operating sensor or the data sensor;
determining if the weight is above or below a weight limit;
calculating an operating life of the catwalk based on the data corresponding to the load via the control system;
calculating a maintenance schedule based on the load exerted on the catwalk, or the operating life of the catwalk;
saving data corresponding to the load exerted on the catwalk and the operating life of the catwalk to a catwalk file;
notifying an operator of a status of the operating life; and
sending a set of instructions to at least one of a rig controller or the control system to alter at least one of power, fluids, or operating parameters supplied to the catwalk based on the operating life.

10. The method of claim 9, wherein the control system and the rig controller are integrated into a single control system.

11. The method of claim 9, further comprising viewing the data that is saved to the catwalk file on a mobile device.

12. The method of claim 9, wherein the set of instructions lessen at least one of the power, the fluids, or the operating parameters supplied to the catwalk if the weight is above the weight limit.

13. The method of claim 9, wherein the set of instructions increase at least one of the power, the fluids, or the operating parameters supplied to the catwalk if the weight is below the weight limit.

14. The method of claim 9, further comprising scheduling maintenance sooner than a scheduled maintenance period if the weight is above the weight limit.

15. The method of claim 9, further comprising scheduling maintenance later than a scheduled maintenance period if the weight is below the weight limit.

16. A system configured to predict and optimize operating life of drilling equipment, comprising:
a catwalk, the catwalk comprising:
a staging rack having a first end and a second end;
a first cross bar having an upper end and a lower end pivotably coupled to the first end of the staging rack;
a first piston assembly having an extendable piston coupled to the first cross bar and disposed within a cylinder coupled proximate to the first end of the staging rack;
a second cross bar having an upper end and a lower end pivotably coupled to the second end of the staging rack;
a second piston assembly having an extendable piston coupled to the second cross bar and disposed within a cylinder coupled proximate to the second end of the staging rack; and
a pipe handling trough pivotably coupled to the upper end of the first cross bar and the upper end of the second cross bar;
a plurality of operating sensors coupled to at least one of the pipe handling trough, the first cross bar, or the second cross bar, wherein each of the operating sensors are configured to measure a load exerted on the pipe handling trough, the first cross bar, or the second cross bar to which the operating sensors are coupled;

a data sensor coupled to the catwalk and configured to receive a set of data from the operating sensors, the data sensor comprising a transmission device configured to send the set of data over a wired or wireless connection, and the set of data corresponding to the load exerted on at least one of the pipe handling trough, the first cross bar, or the second cross bar;

a control system in communication with at least one of the operating sensors or the data sensor and configured to:
  determine a weight of a tubular based on the load exerted on at least one of the pipe handling trough, the first cross bar, or the second cross bar,
  determine if the weight is above or below a weight limit,
  calculate an operating life of the catwalk based on the load exerted on at least one of the pipe handling trough, the first cross bar, or the second cross bar,
  calculate a maintenance schedule based on the load exerted on at least one of the pipe handling trough, the first cross bar, or the second cross bar, or the operating life of the catwalk, the maintenance schedule comprising one or more optimal service intervals, and
  save the set of data sent from at least one of the operating sensors or the data sensor and the operating life to a catwalk file;

a rig controller in communication with at least one of the operating sensors, the data sensor, or the control system, and configured to receive a signal from at least one of the operating sensors, the data sensor, or the control system, and in response alter at least one of power, fluids, or operating parameters supplied to the catwalk; and a mobile device in communication with at least one of the rig controller or the control system, and configured to send instructions to at least one of the rig controller or the control system to alter at least one of power, fluids, or operating parameters supplied to the catwalk, wherein the mobile device is configured to transmit input data to the control system and access the catwalk file.

17. The system of claim 16, wherein the control system is configured to determine the weight of the tubular based on the set of data from the operating sensors.

18. The system of claim 16, wherein the control system includes an operating life algorithm configured to compare the load on at least one of the pipe handling trough, the first cross bar, or the second cross bar to pre-programmed data corresponding to the catwalk.

19. The system of claim 16, wherein the operating sensors include at least one of strain gauges, proximity sensors, or load sensors.

20. The system of claim 16, wherein the data sensor includes a radio frequency identification tag.

21. The system of claim 16, wherein the control system includes an operating life algorithm configured to compare the weight of the tubular to pre-programmed data corresponding to the catwalk to determine if the weight is above or below the weight limit.

* * * * *